United States Patent
Lee

(10) Patent No.: US 6,661,136 B1
(45) Date of Patent: Dec. 9, 2003

(54) EXTERNAL ROTOR MOTOR FOR A TREADMILL

(76) Inventor: Ying-Che Lee, 1st Fl, 6-1, Lane 61, Yung Kang Street, Taipei City (TW)

( * ) Notice: Subject to any disclaimer, the term of this patent is extended or adjusted under 35 U.S.C. 154(b) by 50 days.

(21) Appl. No.: 10/215,003

(22) Filed: Aug. 9, 2002

(51) Int. Cl.[7] .................................................. H02K 7/02
(52) U.S. Cl. ........................................... 310/74; 482/54
(58) Field of Search ................................ 310/74, 67 R; 482/54

(56) References Cited

U.S. PATENT DOCUMENTS

| | | | | |
|---|---|---|---|---|
| 4,121,127 A | * | 10/1978 | Adelski et al. | 310/67 R |
| 5,141,479 A | * | 8/1992 | Vanjani et al. | 482/54 |
| 6,160,334 A | * | 12/2000 | Teshima et al. | 310/67 R |
| 6,455,960 B1 | * | 9/2002 | Trago et al. | 310/64 |

* cited by examiner

Primary Examiner—Nestor Ramirez
Assistant Examiner—Nguyen Hanh
(74) Attorney, Agent, or Firm—Rosenberg, Klein & Lee

(57) ABSTRACT

The present invention relates to an external rotor motor for a treadmill. A supporting shaft extends between mounting brackets. A coil stator is installed in the middle of the supporting shaft. Rotation seats are fitted to both sides of the coil stator by means of bearing, respectively. A belt wheel is arranged at one side of the rotation seat. An external rotor is arranged around the coil stator by means of both rotation seats. An annular thickened section is disposed onto the round housing of the external rotor, thereby forming a flywheel type device. Accordingly, processing and material cost of the present invention can be reduced and the treatment of the dynamic balance is performed only one time so that the required precision is easily achieved.

6 Claims, 5 Drawing Sheets

EXTERNAL ROTOR MOTOR FOR A TREADMILL

BACKGROUND OF THE INVENTION

1. Field of the Invention

The present invention relates to an external rotor motor for a treadmill, and more particularly, to a motor with an external rotor whose inertia is increased such that it itself serves as flywheel.

2. Description of the Prior Art

As shown in FIGS. 1 and 2, the motor 20 of a conventional treadmill 10 is internal rotor type. The output shaft 22 coupled with the interior rotor 21 has to be provided with a heavy inertia flywheel 23 to drive a driven belt wheel 13 connected with a roller 12 of the walking belt 11 of the treadmill 10 through a driving belt wheel 24 and a transmission belt 25. As a result, the walking belt 11 can perform an in-place rotation for the operator to make a walking or jogging exercise thereon. However, not only increases the inertia flywheel 23 of the conventional interior-rotor motor 20 processing and material cost, but also the dynamic balance thereof has to be treated separately from the interior-rotor motor 20. Accordingly, the required precision is not easily achieved.

SUMMARY OF THE INVENTION

It is a primary object of the present invention to provide an external rotor motor for a treadmill, and more particularly, to a motor with an external rotor whose inertia is increased such that it itself serves as flywheel. As a result, processing and material cost can be reduced and the treatment of the dynamic balance is performed only one time. Accordingly, the required precision is easily achieved.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
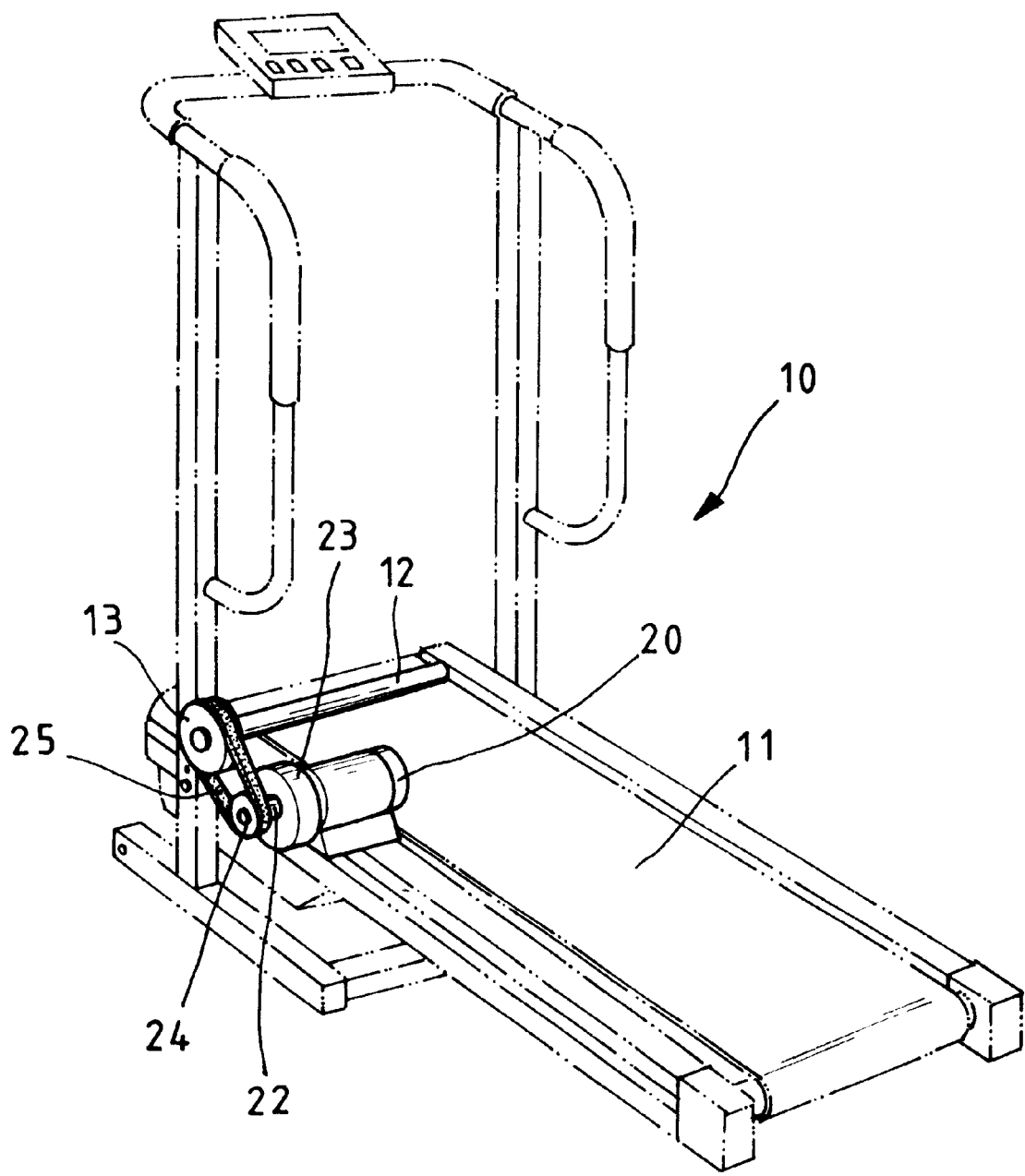
FIG. 1 is a perspective view of a treadmill in connection with a conventional interior-rotor type motor.
Figure 2:
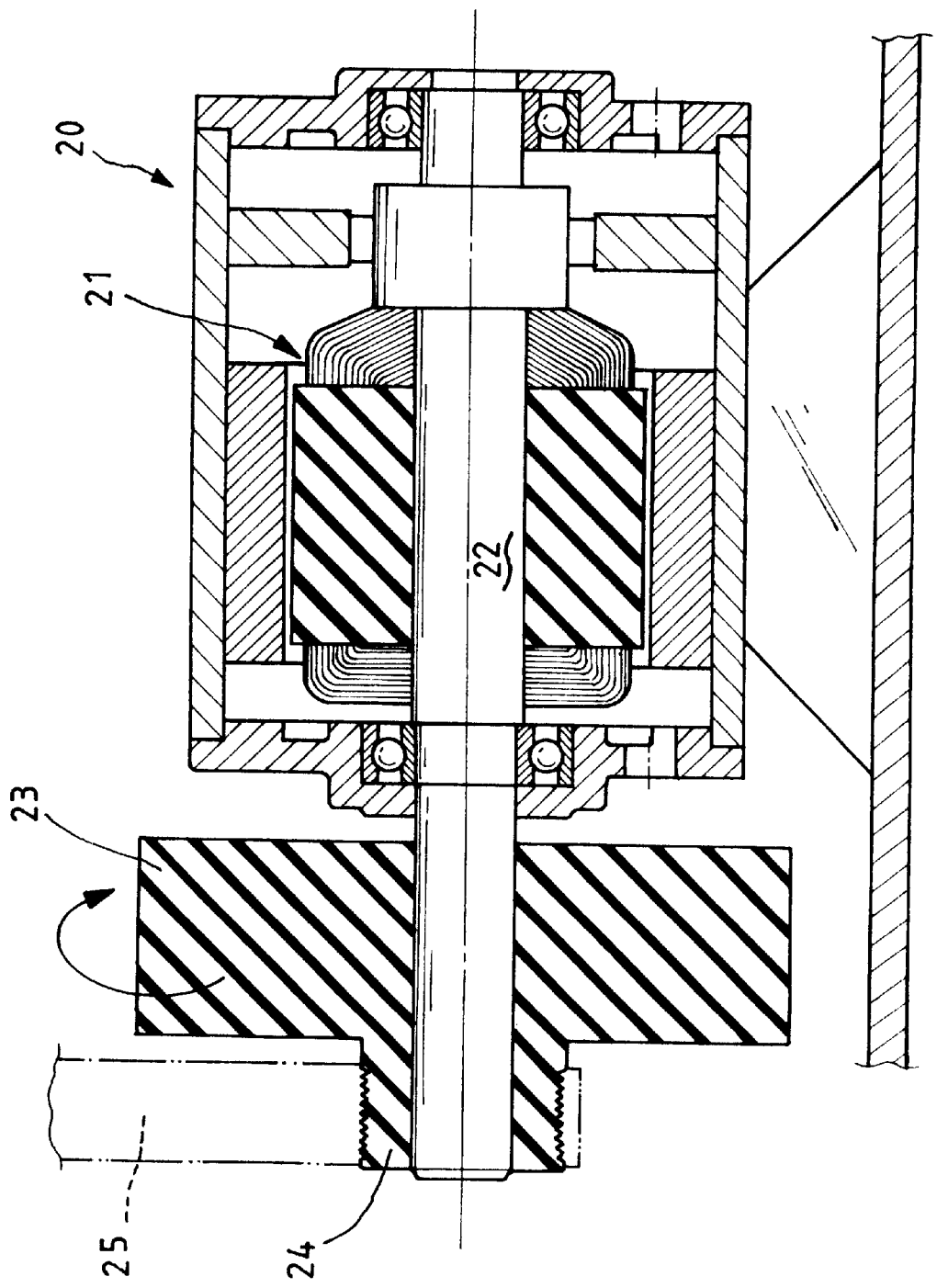
FIG. 2 is a sectional view of the conventional interior-rotor type motor.
Figure 3:
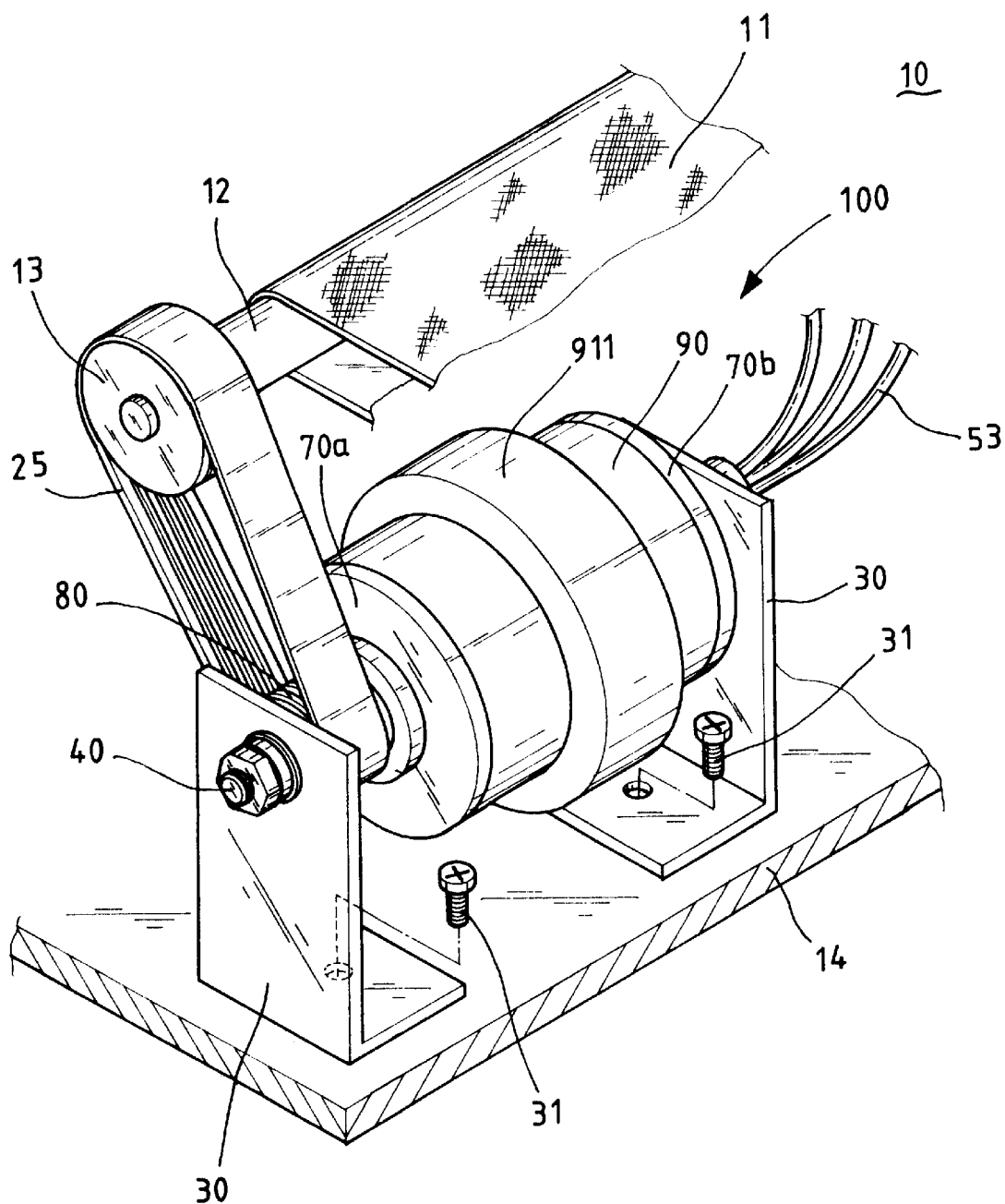
FIG. 3 is a perspective view of the present invention in connection with a roller of walking belt of a treadmill.

First of all, referring to FIGS. 1 and 2, the present invention is fastened onto treadmill's frame 14 by means of mounting brackets 30 and screws 31. A supporting shaft 40 extends between two mounting brackets 30. A coil stator 50 is installed in the middle of the supporting shaft 40. Rotation seats 70a, 70b are fitted to both sides of the coil stator 50 by means of bearing 60, respectively. A belt wheel 80 is arranged at one side of the rotation seat 70a. An external rotor 90 is arranged around the coil stator 50 by means of both rotation seats 70a, 70b. An annular thickened section 911 is disposed onto a round housing 91 of the external rotor 90, thereby forming a flywheel type device.

The coil stator 50 consists of an iron core 51 fastened on the supporting shaft 40 and a coil 52 wound up on the iron core 51. The electric cord 53 of the coil stator 50 extends through a hole 41 at the center of the supporting shaft 40 to the outside of the supporting shaft 40. As a result, the electric cord 53 can be connected to power mains without affecting the rotation of the external rotor 90.

The external rotor 90 consists of a round housing 91 and a plurality of permanent magnets 92 within the round housing 91 to form a brushless motor. Alternatively, a cage core is brought into the round housing 91 to form an AC motor. When the electric current flows through the coil stator 50, the round housing 91 is driven to rotate, thereby forming operational type of an external rotor motor 100.

Figure 4:
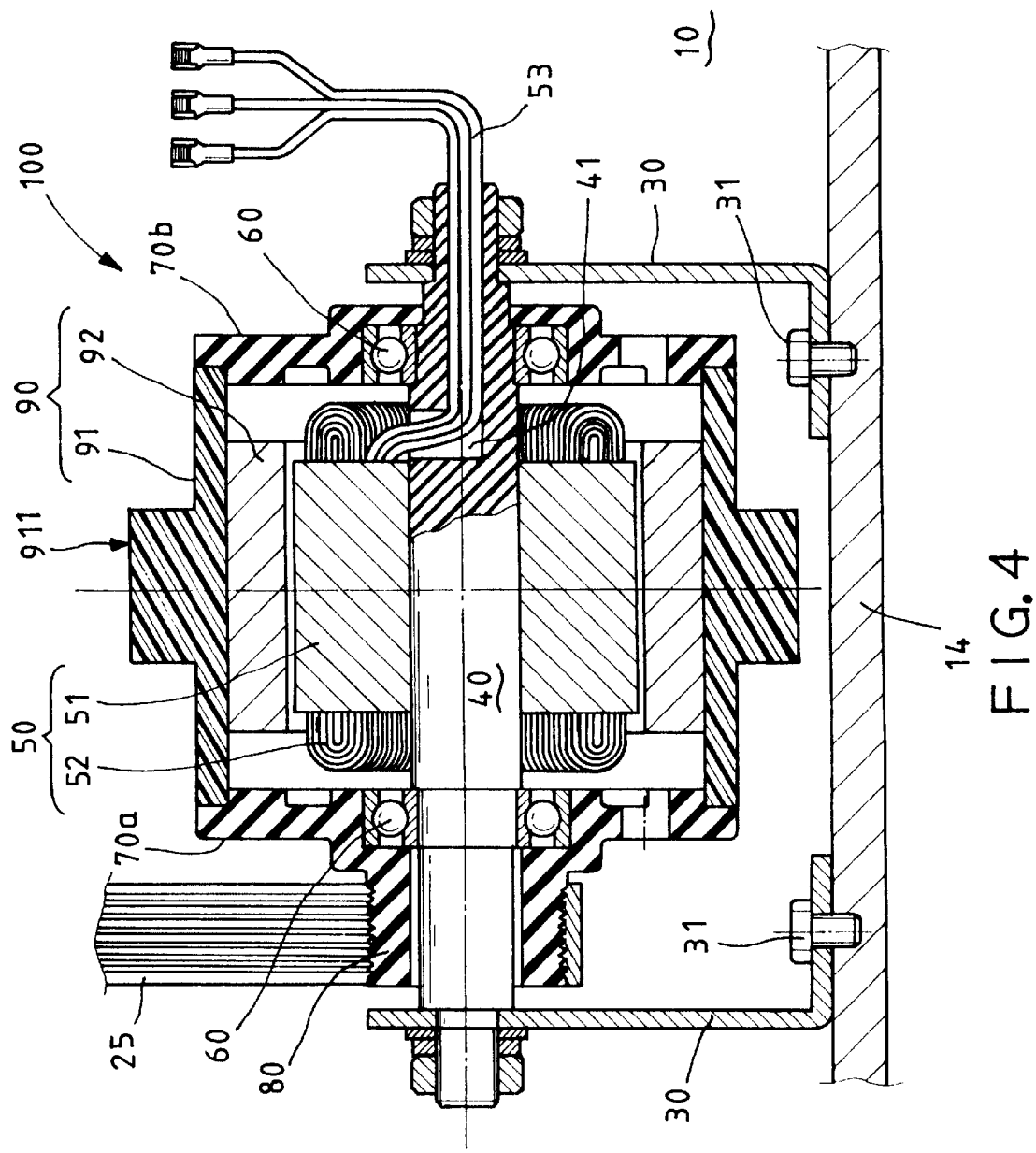
FIG. 4 is a sectional view of a first embodiment of the annular thickened section of the present invention.
Figure 5:
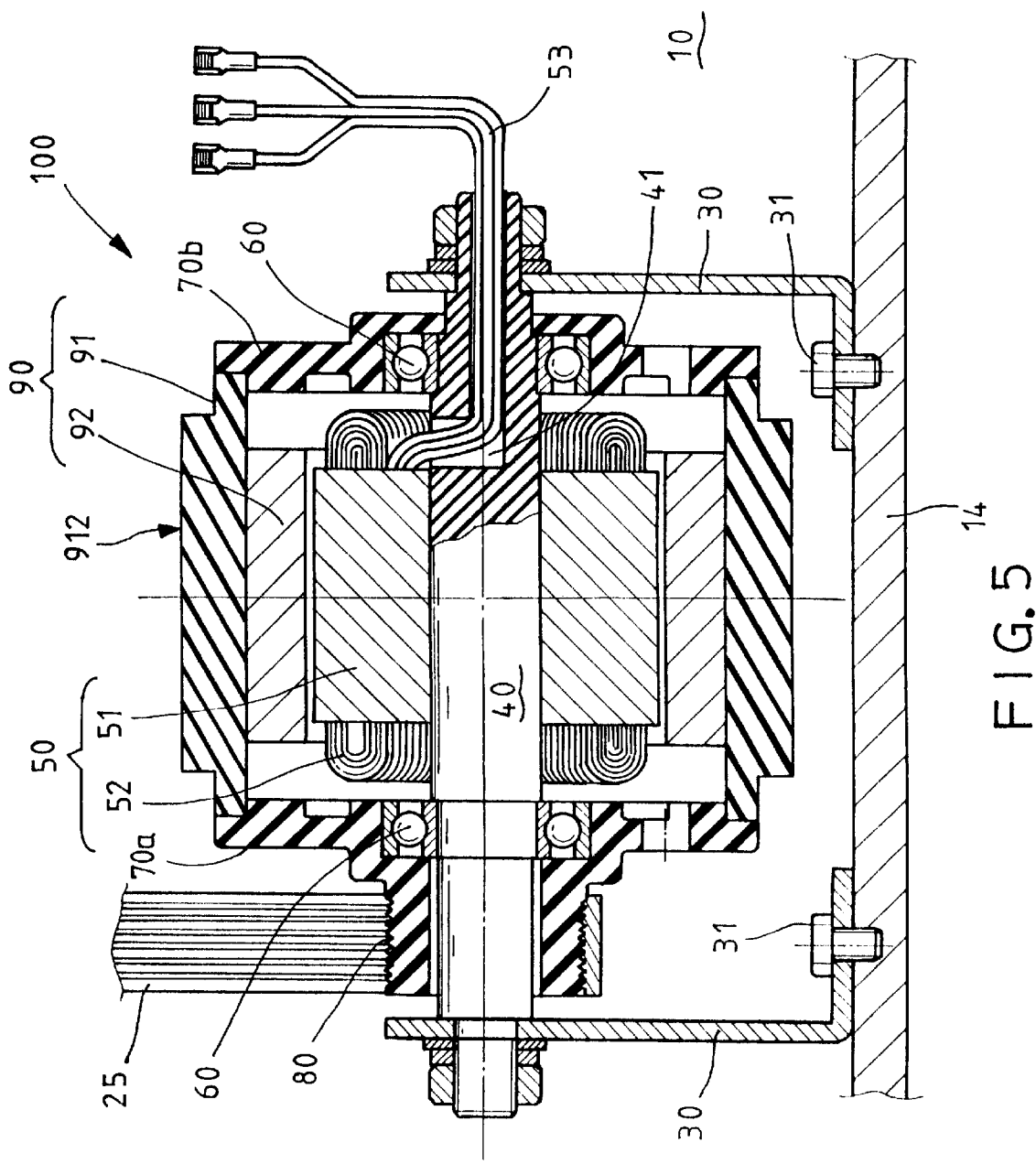
FIG. 5 is a sectional view of a second embodiment of the annular thickened section of the present invention.

As shown in FIG. 4, the annular thickened section 911 serving as inertia flywheel is narrowly and thickly extended around the center of the round housing 91. Alternatively, the annular thickened section 912 is widely and flatly extended around the top of the round housing 91 (see FIG. 5). These two embodiments can achieve required functions of inertia flywheel.

The different annular thickened sections 911, 912 are constructed with the round housing 91 in a body. Alternatively, they can also be fastened around the round housing 91.

Based upon the above-mentioned, a driven belt wheel 13 connected with a roller 12 of the walking belt 11 of the treadmill 10 through a driving belt wheel 80 and a transmission belt 25 can be brought into in-place rotation for the operator to make a walking or jogging exercise thereon. The motor of the present invention is designed to be an external rotor motor. The inertia of the external rotor 90 is increased by adjusting the thickness of the annular thickened section 911, 912.

Unlike that the conventional interior-rotor type treadmill 10 has to be provided with a heavy inertia flywheel 23 at the side of the output shaft, processing and material cost of the present invention can be reduced and the treatment of the dynamic balance is performed only one time. Accordingly, the required precision is easily achieved.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An external rotor motor for a treadmill comprising:

a supporting shaft extending between mounting brackets;

a coil stator installed in the middle of said supporting shaft;

a pair of rotation seats rotatably fitted to said supporting shaft on opposing sides of said coil stator by respective bearings;

a belt wheel coupled to one side of one of said rotation seats;

an external rotor having a round housing disposed around said coil stator and coupled to said rotation seats for rotation therewith relative to said coil stator; and an annular thickened section mounted onto said round housing of said external rotor and centrally disposed between opposing ends thereof, to thereby form a flywheel for said external rotor.

2. The external rotor motor for a treadmill as recited in claim 1 wherein annular thickened section is narrowly and thickly extended around said round housing of said external rotor.

3. The external rotor motor for a treadmill as recited in claim 1 wherein annular thickened section is widely and flatly extended around said round housing of said external rotor.

4. The external rotor motor for a treadmill as recited in claim 1 wherein said annular thickened section and said round housing are formed in a body.

5. The external rotor motor for a treadmill as recited in claim 1 wherein said annular thickened section is fastened around said round housing.

6. The external rotor motor for a treadmill as recited in claim 1 wherein electric cord of said coil stator extends through a hole at the center of said supporting shaft to the outside of said supporting shaft.

* * * * *